US011093012B2

(12) United States Patent
Goergen et al.

(10) Patent No.: US 11,093,012 B2
(45) Date of Patent: *Aug. 17, 2021

(54) COMBINED POWER, DATA, AND COOLING DELIVERY IN A COMMUNICATIONS NETWORK

(71) Applicant: CISCO TECHNOLOGY, INC., San Jose, CA (US)

(72) Inventors: Joel Richard Goergen, Soulsbyville, CA (US); Charles Calvin Byers, Wheaton, IL (US); Robert Gregory Twiss, Chapel Hill, NC (US); D. Brice Achkir, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 15/910,203

(22) Filed: Mar. 2, 2018

(65) Prior Publication Data

US 2019/0272011 A1 Sep. 5, 2019

(51) Int. Cl.
*G06F 1/26* (2006.01)
*H04L 12/10* (2006.01)
(Continued)

(52) U.S. Cl.
CPC ............ *G06F 1/266* (2013.01); *G06F 1/206* (2013.01); *G06N 20/00* (2019.01); *H04L 12/10* (2013.01); *G06F 2200/201* (2013.01); *H04B 7/00* (2013.01)

(58) Field of Classification Search
CPC .... G06F 1/206; G06F 1/266; G06F 2200/201; G06N 20/00; H04B 7/00; H04L 12/10
See application file for complete search history.

(56) References Cited

U.S. PATENT DOCUMENTS

| 3,335,324 | A |   | 8/1967 | Buckeridge |
| 3,962,529 | A | * | 6/1976 | Kubo ...................... H01B 7/29 174/15.6 |

(Continued)

FOREIGN PATENT DOCUMENTS

| CN | 1209880 C | 7/2005 |
| CN | 201689347 U | 12/2010 |

(Continued)

OTHER PUBLICATIONS https://www.fischerconnectors.com/us/en/products/fiberoptic.
(Continued)

*Primary Examiner* — Chad G Erdman
(74) *Attorney, Agent, or Firm* — Cindy Kaplan

(57) ABSTRACT

In one embodiment, a method includes delivering power, data, and cooling from a central network device to a plurality of remote communications devices over cables connecting the central network device to the remote communications devices, each of the cables carrying said power, data, and cooling, and receiving at the central network device, power and thermal data from the remote communications devices based on monitoring of power and cooling at the remote communications devices. The remote communications devices are powered by the power and cooled by the cooling delivered from the central network device. An apparatus is also disclosed herein.

28 Claims, 7 Drawing Sheets

(51) Int. Cl.
  *G06F 1/20*      (2006.01)
  *G06N 20/00*     (2019.01)
  *H04B 7/00*      (2006.01)

(56)              References Cited

U.S. PATENT DOCUMENTS

| | | |
|---|---|---|
| 4,811,187 A     | 3/1989  | Nakajima |
| 4,997,388 A     | 3/1991  | Dale |
| 5,652,893 A     | 7/1997  | Ben-Meir |
| 5,723,848 A *   | 3/1998  | Bilenko .............. G05D 23/1932 |
| | | 219/483 |
| 6,008,631 A     | 12/1999 | Johari |
| 6,220,955 B1    | 4/2001  | Posa |
| 6,259,745 B1    | 7/2001  | Chan |
| 6,636,538 B1    | 10/2003 | Stephens |
| 6,685,364 B1    | 2/2004  | Brezina |
| 6,784,790 B1    | 8/2004  | Lester |
| 6,826,368 B1    | 11/2004 | Koren |
| 6,855,881 B2 *  | 2/2005  | Khoshnood .......... G02B 6/3817 |
| | | 174/15.1 |
| 6,860,004 B2    | 3/2005  | Hirano |
| 7,325,150 B2    | 1/2008  | Lehr |
| 7,420,355 B2    | 9/2008  | Liu |
| 7,490,996 B2    | 2/2009  | Sommer |
| 7,492,059 B2    | 2/2009  | Peker |
| 7,509,505 B2    | 2/2009  | Randall |
| 7,566,987 B2    | 7/2009  | Black et al. |
| 7,583,703 B2    | 9/2009  | Bowser |
| 7,589,435 B2    | 9/2009  | Metsker |
| 7,593,747 B1    | 9/2009  | Karam |
| 7,603,570 B2    | 10/2009 | Schindler |
| 7,616,465 B1    | 11/2009 | Vinciarelli |
| 7,813,646 B2    | 10/2010 | Furey |
| 7,835,389 B2    | 11/2010 | Yu |
| 7,854,634 B2    | 12/2010 | Filipon |
| 7,881,072 B2    | 2/2011  | DiBene |
| 7,915,761 B1    | 3/2011  | Jones |
| 7,921,307 B2    | 4/2011  | Karam |
| 7,924,579 B2    | 4/2011  | Arduini |
| 7,940,787 B2    | 5/2011  | Karam |
| 7,973,538 B2    | 7/2011  | Karam |
| 8,020,043 B2    | 9/2011  | Karam |
| 8,037,324 B2    | 10/2011 | Hussain |
| 8,081,589 B1    | 12/2011 | Gilbrech |
| 8,184,525 B2    | 5/2012  | Karam |
| 8,276,397 B1    | 10/2012 | Carlson et al. |
| 8,279,883 B2    | 10/2012 | Diab |
| 8,310,089 B2    | 11/2012 | Schindler |
| 8,319,627 B2    | 11/2012 | Chan |
| 8,345,439 B1    | 1/2013  | Goergen |
| 8,350,538 B2    | 1/2013  | Cuk |
| 8,358,893 B1    | 1/2013  | Sanderson |
| 8,386,820 B2    | 2/2013  | Diab |
| 8,638,008 B2    | 1/2014  | Baldwin et al. |
| 8,700,923 B2    | 4/2014  | Fung |
| 8,712,324 B2    | 4/2014  | Corbridge |
| 8,750,710 B1    | 6/2014  | Hirt |
| 8,768,528 B2    | 7/2014  | Millar et al. |
| 8,781,637 B2    | 7/2014  | Eaves |
| 8,787,775 B2    | 7/2014  | Earnshaw |
| 8,829,917 B1    | 9/2014  | Lo et al. |
| 8,836,228 B2    | 9/2014  | Xu |
| 8,842,430 B2    | 9/2014  | Hellriegel et al. |
| 8,849,471 B2    | 9/2014  | Daniel |
| 8,966,747 B2    | 3/2015  | Vinciarelli |
| 9,019,895 B2    | 4/2015  | Li |
| 9,024,473 B2    | 5/2015  | Huff |
| 9,184,795 B2    | 11/2015 | Eaves |
| 9,189,036 B2    | 11/2015 | Ghoshal |
| 9,189,043 B2    | 11/2015 | Vorenkamp |
| 9,273,906 B2    | 3/2016  | Goth et al. |
| 9,319,101 B2    | 4/2016  | Lontka |
| 9,321,362 B2    | 4/2016  | Woo |
| 9,373,963 B2    | 6/2016  | Kuznelsov |
| 9,419,436 B2    | 8/2016  | Eaves |
| 9,484,771 B2    | 11/2016 | Braylovskiy |
| 9,510,479 B2    | 11/2016 | Vos |
| 9,531,551 B2    | 12/2016 | Balasubramanian |
| 9,590,811 B2    | 3/2017  | Hunter, Jr. |
| 9,618,714 B2    | 4/2017  | Murray |
| 9,640,998 B2    | 5/2017  | Dawson et al. |
| 9,665,148 B2    | 5/2017  | Hamdi |
| 9,693,244 B2    | 6/2017  | Maruhashi et al. |
| 9,734,940 B1    | 8/2017  | McNutt |
| 9,853,689 B2    | 12/2017 | Eaves |
| 9,874,930 B2    | 1/2018  | Vavilala |
| 9,882,656 B2    | 1/2018  | Sipes et al. |
| 9,893,521 B2    | 2/2018  | Lowe |
| 9,948,198 B2    | 4/2018  | Imai |
| 9,979,370 B2    | 5/2018  | Xu |
| 9,985,600 B2    | 5/2018  | Xu |
| 10,007,628 B2   | 6/2018  | Pitigoi-Aron |
| 10,028,417 B2   | 7/2018  | Schmidtke |
| 10,128,764 B1   | 11/2018 | Vinciarelli |
| 10,248,178 B2   | 4/2019  | Brooks |
| 10,263,526 B2   | 4/2019  | Sandusky et al. |
| 10,281,513 B1   | 5/2019  | Goergen |
| 10,407,995 B2   | 9/2019  | Moeny |
| 10,439,432 B2   | 10/2019 | Eckhardt |
| 10,541,543 B2   | 1/2020  | Eaves |
| 10,541,758 B2   | 1/2020  | Goergen |
| 10,631,443 B2   | 4/2020  | Byers |
| 10,735,105 B2   | 8/2020  | Goergen et al. |
| 2001/0024373 A1 | 9/2001  | Cuk |
| 2002/0126967 A1 | 9/2002  | Panak |
| 2004/0000816 A1 | 1/2004  | Khoshnood |
| 2004/0033076 A1 | 2/2004  | Song |
| 2004/0043651 A1 | 3/2004  | Bain |
| 2004/0073703 A1 | 4/2004  | Boucher |
| 2004/0264214 A1 | 12/2004 | Xu |
| 2005/0197018 A1 | 9/2005  | Lord |
| 2005/0268120 A1 | 12/2005 | Schindler |
| 2006/0202109 A1 | 9/2006  | Delcher |
| 2006/0209875 A1 | 9/2006  | Lum |
| 2007/0103168 A1 | 5/2007  | Batten |
| 2007/0143508 A1 | 6/2007  | Linnman |
| 2007/0236853 A1 | 10/2007 | Crawley |
| 2007/0263675 A1 | 11/2007 | Lum |
| 2007/0284941 A1 | 12/2007 | Robbins |
| 2007/0284946 A1 | 12/2007 | Robbins |
| 2007/0288125 A1 | 12/2007 | Quaratiello |
| 2007/0288771 A1 | 12/2007 | Robbins |
| 2008/0054720 A1 | 3/2008  | Lum |
| 2008/0198635 A1 | 8/2008  | Hussain |
| 2008/0229120 A1 | 9/2008  | Diab |
| 2008/0310067 A1 | 12/2008 | Diab |
| 2009/0027033 A1 | 1/2009  | Diab |
| 2010/0077239 A1 | 3/2010  | Diab |
| 2010/0117808 A1 | 5/2010  | Karam |
| 2010/0171602 A1 | 7/2010  | Kabbara |
| 2010/0190384 A1 | 7/2010  | Lanni |
| 2010/0237846 A1 | 9/2010  | Vetteth |
| 2010/0290190 A1 | 11/2010 | Chester |
| 2011/0004773 A1 | 1/2011  | Hussain |
| 2011/0007664 A1 | 1/2011  | Diab |
| 2011/0290497 A1 | 1/2011  | Stenevik |
| 2011/0057612 A1* | 3/2011 | Taguchi ................ H04Q 9/00 |
| | | 320/109 |
| 2011/0083824 A1 | 4/2011  | Rogers |
| 2011/0228578 A1 | 9/2011  | Serpa |
| 2011/0266867 A1 | 11/2011 | Schindler |
| 2012/0043935 A1* | 2/2012 | Dyer ..................... B60L 53/305 |
| | | 320/109 |
| 2012/0064745 A1 | 3/2012  | Ottliczky |
| 2012/0170927 A1 | 7/2012  | Huang |
| 2012/0201089 A1 | 8/2012  | Barth et al. |
| 2012/0231654 A1 | 9/2012  | Conrad |
| 2012/0287984 A1 | 11/2012 | Lee |
| 2012/0317426 A1 | 12/2012 | Hunter, Jr. |
| 2012/0319468 A1 | 12/2012 | Schneider |
| 2013/0077923 A1 | 3/2013  | Peeters Weem et al. |
| 2013/0079633 A1 | 3/2013  | Peeters Weem |
| 2013/0103220 A1 | 4/2013  | Eaves |
| 2013/0249292 A1 | 9/2013  | Blackwell, Jr. |

(56) References Cited

U.S. PATENT DOCUMENTS

| | | |
|---|---|---|
| 2013/0272721 A1 | 10/2013 | van Veen |
| 2013/0329344 A1 | 12/2013 | Tucker |
| 2014/0111180 A1 | 4/2014 | Vladan |
| 2014/0126151 A1 | 5/2014 | Campbell |
| 2014/0129850 A1 | 5/2014 | Paul |
| 2014/0258742 A1 | 9/2014 | Chien |
| 2014/0258813 A1 | 9/2014 | Lusted |
| 2014/0265550 A1 | 9/2014 | Milligan |
| 2014/0372773 A1 | 12/2014 | Heath |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0207317 A1 | 7/2015 | Radermacher |
| 2015/0215001 A1 | 7/2015 | Eaves |
| 2015/0215131 A1 | 7/2015 | Paul |
| 2015/0333918 A1 | 11/2015 | White, III |
| 2015/0340818 A1 | 11/2015 | Scherer |
| 2015/0365003 A1 | 12/2015 | Sadwick |
| 2016/0018252 A1 | 1/2016 | Hanson |
| 2016/0020911 A1 | 1/2016 | Sipes, Jr. |
| 2016/0053596 A1* | 2/2016 | Rey .............. E21B 43/2401 166/302 |
| 2016/0064938 A1 | 3/2016 | Balasubramanian |
| 2016/0111877 A1 | 4/2016 | Eaves |
| 2016/0118784 A1 | 4/2016 | Saxena |
| 2016/0120059 A1* | 4/2016 | Shedd .............. F25B 41/40 165/244 |
| 2016/0133355 A1 | 5/2016 | Glew |
| 2016/0134331 A1 | 5/2016 | Eaves |
| 2016/0142217 A1 | 5/2016 | Gardner et al. |
| 2016/0188427 A1 | 6/2016 | Chandrashekar |
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer et al. |
| 2016/0273722 A1 | 9/2016 | Crenshaw |
| 2016/0294500 A1 | 10/2016 | Chawgo |
| 2016/0294568 A1 | 10/2016 | Chawgo et al. |
| 2016/0308683 A1 | 10/2016 | Pischl |
| 2016/0352535 A1 | 12/2016 | Hiscock |
| 2017/0041152 A1 | 2/2017 | Sheffield |
| 2017/0041153 A1 | 2/2017 | Picard |
| 2017/0054296 A1 | 2/2017 | Daniel |
| 2017/0110871 A1 | 4/2017 | Foster |
| 2017/0123466 A1 | 5/2017 | Carnevale |
| 2017/0146260 A1 | 5/2017 | Ribbich |
| 2017/0155517 A1 | 6/2017 | Cao |
| 2017/0164525 A1 | 6/2017 | Chapel |
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0244318 A1 | 8/2017 | Giuliano |
| 2017/0248976 A1 | 8/2017 | Moller |
| 2017/0294966 A1 | 10/2017 | Jia |
| 2017/0325320 A1 | 11/2017 | Wendt |
| 2018/0024964 A1 | 1/2018 | Mao |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello |
| 2018/0102604 A1 | 4/2018 | Keith |
| 2018/0123360 A1 | 5/2018 | Eaves |
| 2018/0159430 A1 | 6/2018 | Albert |
| 2018/0188712 A1 | 7/2018 | MacKay |
| 2018/0191513 A1* | 7/2018 | Hess .............. H04L 12/403 |
| 2018/0254624 A1 | 9/2018 | Son |
| 2018/0313886 A1 | 11/2018 | Mlyniec |
| 2018/0340840 A1 | 11/2018 | Bullock |
| 2019/0064890 A1 | 2/2019 | Donachy |
| 2019/0126764 A1* | 5/2019 | Fuhrer .............. B60L 53/31 |
| 2019/0267804 A1 | 8/2019 | Matan |
| 2019/0277899 A1 | 9/2019 | Goergen |
| 2019/0277900 A1 | 9/2019 | Goergen |
| 2019/0278347 A1 | 9/2019 | Goergen |
| 2019/0280895 A1 | 9/2019 | Mather |
| 2019/0304630 A1 | 10/2019 | Goergen |
| 2019/0312751 A1 | 10/2019 | Goergen |
| 2019/0342011 A1 | 10/2019 | Goergen |
| 2019/0363493 A1 | 11/2019 | Sironi |
| 2020/0044751 A1 | 2/2020 | Goergen |

FOREIGN PATENT DOCUMENTS

| | | |
|---|---|---|
| CN | 204836199 U | 12/2015 |
| CN | 205544597 | 8/2016 |
| CN | 104081237 B | 10/2016 |
| CN | 103490907 B | 12/2017 |
| CN | 104412541 B | 5/2019 |
| EP | 1936861 A1 | 6/2008 |
| EP | 2120443 A1 | 11/2009 |
| EP | 2257009 A2 | 12/2010 |
| EP | 2432134 A1 | 3/2012 |
| EP | 2693688 A1 | 2/2014 |
| WO | WO199316407 A1 | 8/1993 |
| WO | WO2006127916 A2 | 11/2006 |
| WO | WO2010053542 | 5/2010 |
| WO | WO2017054030 | 4/2017 |
| WO | WO2017167926 A1 | 10/2017 |
| WO | WO2018017544 A1 | 1/2018 |
| WO | WO2019023731 A1 | 2/2019 |
| WO | WO2019212759 A1 | 11/2019 |

OTHER PUBLICATIONS http://www.strantech.com/products/tfoca-genx-hybrid-2x2-fiber-optic-copper-connector/.

http://www.qpcfiber.com/product/connectors/e-link-hybrid-connector/.

https://www.lumentum.com/sites/default/files/technical-library-items/poweroverfiber-tn-pv-ae_0.pdf.

"Network Remote Power Using Packet Energy Transfer", Eaves et al., www.voltserver.com, Sep. 2012.

Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.

Implementation Guide, "Virtual Chassis Technology Best Practices", Juniper Networks, 8010018-009-EN, Jan. 2016, https://wwwjuniper.net/us/en/local/pdf/implementation-guides/8010018-en.pdf, 29 pages.

Yencheck, Thermal Modeling of Portable Power Cables, 1993.

Zhang, Machine Learning-Based Temperature Prediction for Runtime Thermal Management across System Components, Mar. 2016.

Data Center Power Equipment Thermal Guidelines and Best Practices.

Dynamic Thermal Rating of Substation Terminal Equipment by Rambabu Adapa, 2004.

Chen, Real-Time Termperature Estimation for Power MOSEFETs Conidering Thermal Aging Effects:, IEEE Trnasactions on Device and Materials Reliability, vol. 14, No. 1, Mar. 2014.

Jingquan Chen et al: "Buck-boost PWM converters having two independently controlled switches", 32nd Annual IEEE Power Electronics Specialists Conference. PESC 2001. Conference Proceedings, Vancouver, Canada, Jun. 17-21, 2001; [Annual Power Electronics Specialists Conference], New York, NY: IEEE, US, vol. 2,Jun. 17, 2001 (Jun. 17, 2001), pp. 736-741, XP010559317, DOI: 10.1109/PESC.2001.954206, ISBN 978-0-7803-7067-8 paragraph [SectionII]; figure 3.

Cheng K W E et al: "Constant Frequency, Two-Stage Quasiresonant Convertor", IEE Proceedings B. Electrical Power Applications, 1271980 1, vol. 139, No. 3, May 1, 1992 (May 1, 1992), pp. 227-237, XP000292493, the whole document.

Petition for Post Grant Review of U.S. Pat. No. 10,735,105 [Public] with Exhibits, filed Feb. 16, 2021, PGR 2021-00055.

Petition for Post Grant Review of U.S. Pat. No. 10,735,105 [Public] with Exhibits, filed Feb. 16, 2021, PGR 2021-00056.

Eaves, S. S., Network Remote Powering Using Packet Energy Transfer, Proceedings of IEEE International Conference on Tele-

(56) References Cited

OTHER PUBLICATIONS communications Energy (INTELEC) 2012, Scottsdale, AZ, Sep. 30-Oct. 4, 2012 (IEEE 2012) (EavesIEEE).
Edelstein S., Updated 2016 Tesla Model S also gets new 75-kWh battery option, (Jun. 19, 2016), archived Jun. 19, 2016 by Internet Archive Wayback machine at https://web.archive.org/web/20160619001148/https://www.greencarreports.com/news/1103782_updated-2016-tesla-model-s-also-gets-new-7 5-kwh-battery-option ("Edelstein").
NFPA 70 National Electrical Code, 2017 Edition (NEC).
International Standard IEC 62368-1 Edition 2.0 (2014), ISBN 978-2-8322-1405-3 ("IEC-62368").
International Standard IEC/TS 60479-1 Edition 4.0 (2005), ISBN 2-8318-8096-3 ("IEC-60479").
International Standard IEC 60950-1 Edition 2.2 (2013), ISBN 978-2-8322-0820-5 ("IEC-60950").
International Standard IEC 60947-1 Edition 5.0 (2014), ISBN 978-2-8322-1798-6 ("IEC-60947").
Tanenbaum, A. S., Computer Networks, Third Edition (1996) ("Tanenbaum").
Stallings, W., Data and Computer Communications, Fourth Edition (1994) ("Stallings").
Alexander, C. K., Fundamentals of Electric Circuits, Indian Edition (2013) ("Alexander").
Hall, S. H., High-Speed Digital System Design, A Handbook of Interconnect Theory and Design Practices (2000) ("Hall").
Sedra, A. S., Microelectronic Circuits, Seventh Edition (2014) ("Sedra").
Lathi, B. P., Modern Digital and Analog Communication Systems, Fourth Edition (2009) ("Lathi").
Understanding 802.3at PoE Plus Standard Increases Available Power (Jun. 2011) ("Microsemi").

\* cited by examiner

COMBINED POWER, DATA, AND COOLING DELIVERY IN A COMMUNICATIONS NETWORK

TECHNICAL FIELD

The present disclosure relates generally to communications networks, and more particularly, to power, data, and cooling delivery in a communications network.

BACKGROUND

Network devices such as computer peripherals, network access points, and IoT (Internet of Things) devices may have both their data connectivity and power needs met over a single combined function cable. Examples of technologies that provide this function are USB (Universal Serial Bus) and PoE (Power over Ethernet). In conventional PoE systems, power is delivered over the cables used by the data over a range from a few meters to about one hundred meters. When a greater distance is needed or fiber optic cables are used, power is typically supplied through a local power source such as a wall outlet due to limitations with capacity, reach and cable loss in conventional PoE. Today's PoE systems also have limited power capacity, which may be inadequate for many classes of devices. If the available power over combined function cables is increased, traditional convection cooling methods may be inadequate for high powered devices.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
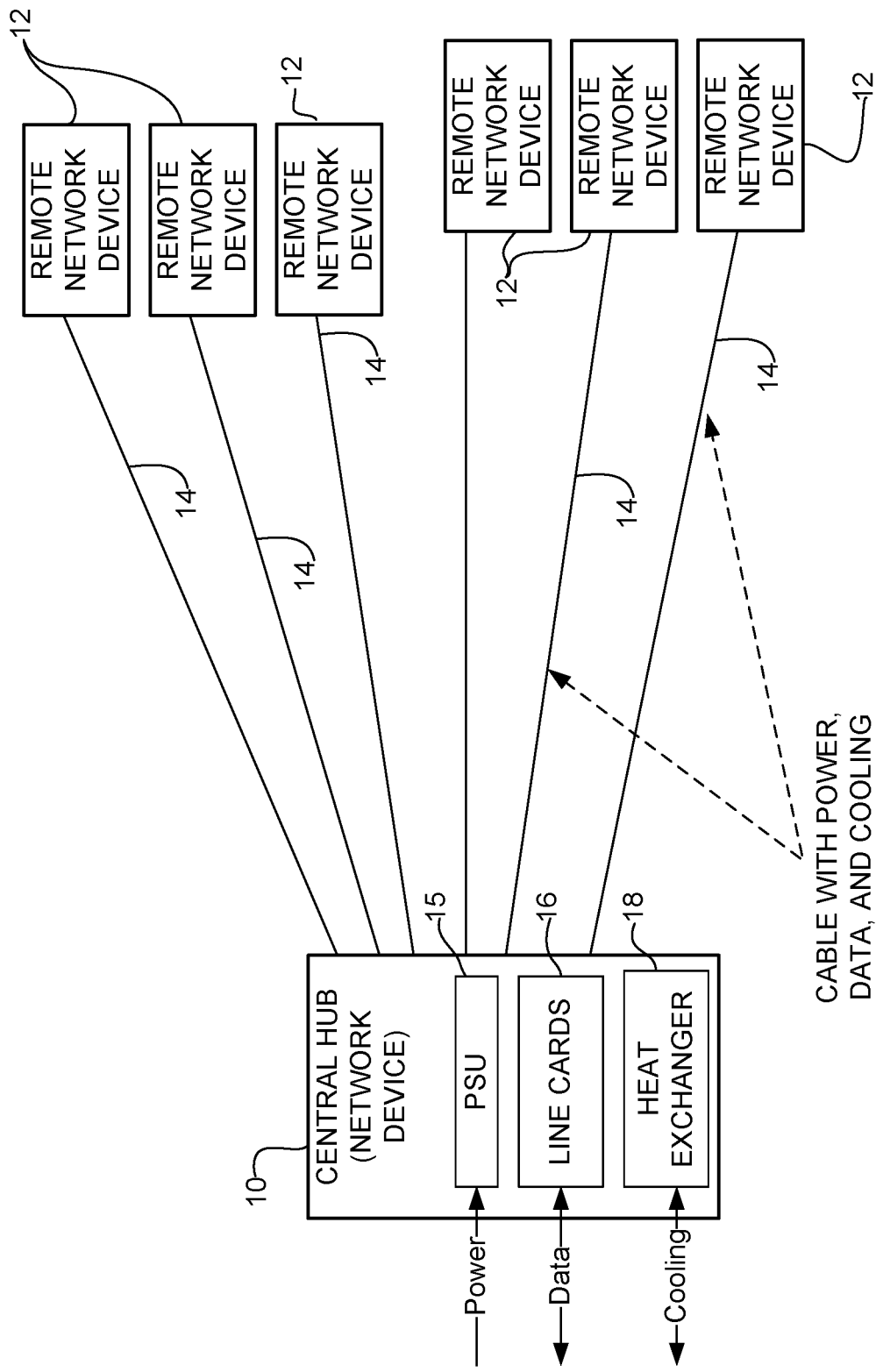
FIG. 1 illustrates an example of a network in which embodiments described herein may be implemented.

In one embodiment, a method generally comprises delivering power, data, and cooling from a central network device to a plurality of remote communications devices over cables connecting the central network device to the remote communications devices, each of the cables carrying said power, data, and cooling, and receiving at the central network device, power and thermal data from the remote communications devices based on monitoring of power and cooling at the remote communications devices. The remote communications devices are powered by the power and cooled by the cooling delivered from the central network device.

In another embodiment, an apparatus generally comprises a connector for connecting the apparatus to a cable delivering power, data, and cooling to the apparatus, the connector comprising an optical interface for receiving optical communications signals, an electrical interface for receiving power for powering the apparatus, and a fluid interface for receiving coolant. The apparatus further comprises a cooling loop for cooling electrical components of the apparatus with the coolant and a monitoring system for monitoring the cooling loop and providing feedback to a central network device delivering the power, data, and cooling to the apparatus over the cable.

In yet another embodiment, an apparatus generally comprises a connector for connecting the apparatus to a cable delivering power, data, and cooling to a plurality of remote communications devices, the connector comprising an optical interface for delivering optical communications signals, an electrical interface for delivering power for powering the remote communications devices, and a fluid interface for delivering cooling to the remote communications devices. The apparatus further comprises a control system for modifying delivery of the cooling to the remote communications devices based on feedback received from the remote communications devices.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In conventional Power over Ethernet (PoE) systems used to simultaneously transmit power and data communications, power is delivered over the same twisted pair cable used for data. These systems are limited in range to a few meters to about 100 meters. The maximum power delivery capacity of standard PoE is approximately 100 Watts, but many classes of powered devices would benefit from power delivery of 1000 Watts or more. In conventional systems, when a larger distance is needed fiber optic cabling is used to deliver data and when larger power delivery ratings are needed power is supplied to a remote device through a local power source.

As previously noted, it is desirable to increase the power available over multi-function cables to hundreds and even thousands of watts. This capability may enable many new choices in network deployments where major devices such as workgroup routers, multi-socket servers, large displays, wireless access points, or fog nodes are operated over multi-function cables. This capability would greatly decrease installation complexity and improve the total cost of ownership of a much wider set of devices that have their power and data connectivity needs met from a central hub.

Beyond the data and power supply capabilities noted above, there is also a need for cooling. For high-powered devices, especially those with high thermal density packaging or total dissipation over a few hundred Watts, traditional convection cooling methods may be inadequate. This is particularly apparent where special cooling challenges are present, such as with a device that is sealed and cannot rely on drawing outside air (e.g., all-season outdoor packaging), a hermetically sealed device (e.g., used in food processing or explosive environments), or where fan noise is a problem (e.g., office or residential environments), or any combination of the above along with extreme ambient temperature environments. In these situations, complex and expensive specialized cooling systems are often used.

The embodiments described herein provide cooling capability along with data and power, thereby significantly enhancing the functionality of multi-function cables. In one or more embodiments, a cable system, referred to herein as PoE+Fiber+Cooling (PoE+F+C), provides high power energy delivery, fiber delivered data, and cooling within a single cable. The PoE+F+C system allows high power devices to be located in remote locations, extreme temperature environments, or noise sensitive environments, with their cooling requirements met through the same cable that carries data and power. As described in detail below, coolant flows through the cable carrying the power and data to remote communications devices to provide a single multi-use cable that serves all of the functions that a high power node would need, including cooling. This use of a single cable for all interconnect functions required by a remote device can greatly simplify installation and ongoing operation of the device.

Referring now to the drawings, and first to FIG. 1, an example of a network in which embodiments described herein may be implemented is shown. For simplification, only a small number of nodes are shown. The embodiments operate in the context of a data communications network including multiple network devices. The network may include any number of network devices in communication via any number of nodes (e.g., routers, switches, gateways, controllers, access points, or other network devices), which facilitate passage of data within the network. The network devices may communicate over or be in communication with one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet of Things (IoT), optical network, Internet, intranet, or any other network).

The network is configured to provide power (e.g., power greater than 100 Watts), data (e.g., optical data), and cooling from a central network device 10 to a plurality of remote network devices 12 (e.g., switches, routers, servers, access points, computer peripherals, Internet of Things (IoT) devices, fog nodes, or other electronic components and devices). Signals may be exchanged among communications equipment and power transmitted from power sourcing equipment (e.g., central hub 10) to powered devices (e.g., remote communications devices 12). As described in detail below, the PoE+F+C system delivers power, data, and cooling to a network (e.g., switch/router system) configured to receive data, power, and cooling over a cabling system comprising optical fibers, electrical wires (e.g., copper wires), and coolant tubes.

As shown in the example of FIG. 1, the PoE+F+C system comprises the central hub 10 in communication with the remote devices 12 via a plurality of cables 14, each cable configured for delivering power, data, and cooling. The central hub 10 may be in communication with any number of remote devices 12. For example, the central hub 10 may serve anywhere from a few remote devices 12 to hundreds of remote devices (or any number in between). The remote devices 12 may also be in communication with one or more other device (e.g., fog node, IoT device, sensor, and the like). The network may include any number or arrangement of network communications devices (e.g., switches, access points, routers, or other devices operable to route (switch, forward) data communications). The remote devices 12 may be located at distances greater than 100 meters (e.g., 1 km, 10 km, or any other distance), and/or operate at greater power levels than 100 Watts (e.g., 250 Watts, 1000 Watts, or any other power level). In one or more embodiments, there is no need for additional electrical wiring for the communications network and all of the network communications devices operate using the power provided by the PoE+F+C system.

One or more network devices may also deliver power to equipment using PoE. For example, one or more of the network devices 12 may deliver power using PoE to electronic components such as IP (Internet Protocol) cameras, VoIP (Voice over IP) phones, video cameras, point-of-sale devices, security access control devices, residential devices, building automation devices, industrial automation, factory equipment, lights (building lights, streetlights), traffic signals, and many other electrical components and devices.

In the example shown in FIG. 1, the central hub 10 comprises a power supply unit (PSU) (power distribution module) 15 for receiving power (e.g., building power from a power grid, renewable energy source, generator or battery), a network interface (e.g., fabric, line cards) 16 for receiving data from or transmitting data to a network (e.g., Internet), and a heat exchanger 18 in fluid communication with a cooling plant.

The central hub 10 may be operable to provide high capacity power from an internal power system (e.g., PSU providing over and including 5 kW (e.g., 10 kW, 12 kW, 14 kW, 16 kW), or PSU providing over and including 100 W (e.g., 500 W, 1 kW) of useable power or any other suitable power capacity). The PSU 15 may provide, for example, PoE, pulsed power, DC power, or AC power. The central hub 10 (PSE (Power Sourcing Equipment)) is operable to receive power external from a communications network and transmit the power, along with data and cooling, over the cables 14 in the communications network to the remote network devices (PDs (Powered Devices)) 12. The central hub 10 may comprise, for example, a router, convergence device, or any other suitable network device operable to deliver power, data, and cooling. Additional components and functions of the central hub 10 are described below with respect to FIG. 3.

Figure 6A:
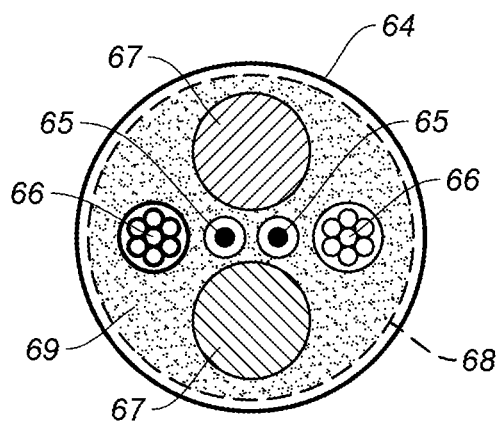
FIG. 6A is a cross-sectional view of a composite cable, in accordance with one embodiment.
Figure 6B:
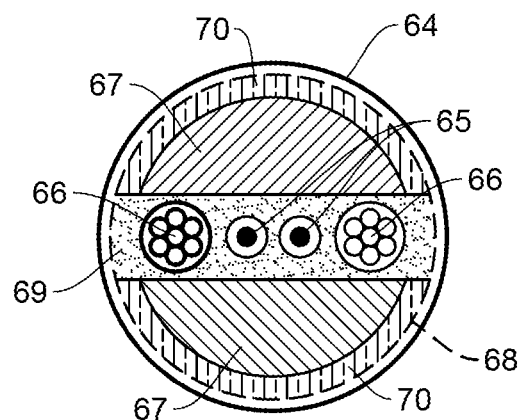
FIG. 6B is a cross-sectional view of a composite cable, in accordance with another embodiment.
Figure 6C:
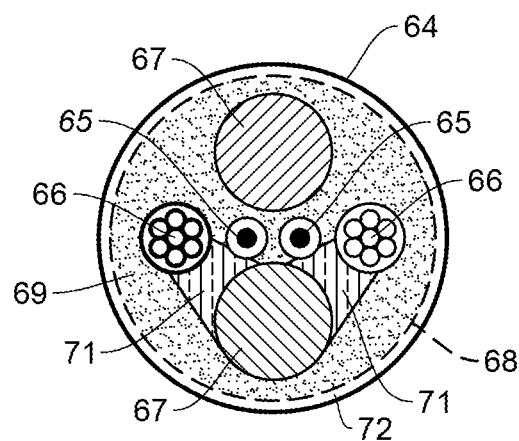
FIG. 6C is a cross-sectional view of a composite cable, in accordance with yet another embodiment.

Cables 14 extending from the central hub 10 to the remote communications devices 12 are configured to transmit power, data, and cooling in a single cable (combined cable, multi-function cable, multi-use cable, hybrid cable). The cables 14 may be formed from any material suitable to carry electrical power, data (copper, fiber), and coolant (liquid, gas, or multi-phase) and may carry any number of electrical wires, optical fibers, and cooling tubes in any arrangement. Examples of cable configurations are shown in FIGS. 6A, 6B, 6C, and described below.

In one embodiment, power and data are received at an optical transceiver (optical module, optical device, optics module, transceiver, silicon photonics optical transceiver) configured to source or receive power, as described in U.S. patent application Ser. No. 15/707,976 ("Power Delivery Through an Optical System", filed Sep. 18, 2017), incorporated herein by reference in its entirety. The transceiver modules operate as an engine that bidirectionally converts optical signals to electrical signals or in general as an interface to the network element copper wire or optical fiber. In one or more embodiments, the optical transceiver may be a pluggable transceiver module in any form factor (e.g., SFP (Small Form-Factor Pluggable), QSFP (Quad Small Form-Factor Pluggable), CFP (C Form-Factor Pluggable), and the like), and may support data rates up to 400 Gbps, for example. Hosts for these pluggable optical modules include line cards on the central hub 10 or network devices 12. The host may include a printed circuit board (PCB) and electronic components and circuits operable to interface telecommunications lines in a telecommunications network. The host may be configured to perform one or more operations and receive any number or type of pluggable transceiver modules configured for transmitting and receiving signals.

The optical transceiver may also be configured for operation with AOC (Active Optical Cable) and form factors used in UWB (Ultra-Wideband) applications, including for example, Ultra HDMI (High-Definition Multimedia Interface), serial high bandwidth cables (e.g., thunderbolt), and other form factors. Also, it may be noted that the optical transceivers may be configured for operation in point-to-multipoint or multipoint-to-point topology. For example, QFSP may breakout to SFP+. One or more embodiments may be configured to allow for load shifting.

In one embodiment, one or more network devices may comprise dual-role power ports that may be selectively configurable to operate as a PSE (Power Source Equipment) port to provide power to a connected device or as a PD (Powered Device) port to sink power from the connected device, and enable the reversal of energy flow under system control, as described in U.S. Pat. No. 9,531,551 ("Dynamically Configurable Power-Over-Ethernet Apparatus and Method", issued Dec. 27, 2016), for example. The dual-role power ports may be PoE or PoE+F ports, for example, enabling them to negotiate their selection of, for example, either PoE or higher power POE+F in order to match the configurations of the ports on line cards 16 with the corresponding ports on each remote network device 12.

In addition to the remote communications devices 12 configured to receive power, data, and cooling from the central hub 10, the network may also include one or more network devices comprising conventional network devices that only process and transmit data. These network devices receive electrical power from a local power source such as a wall outlet. Similarly, one or more network devices may eliminate the data interface, and only interconnect power (e.g., moving data interconnection to wireless networks). Also, one or more devices may be configured to receive only power and data, or only power and cooling, for example.

Figure 2:
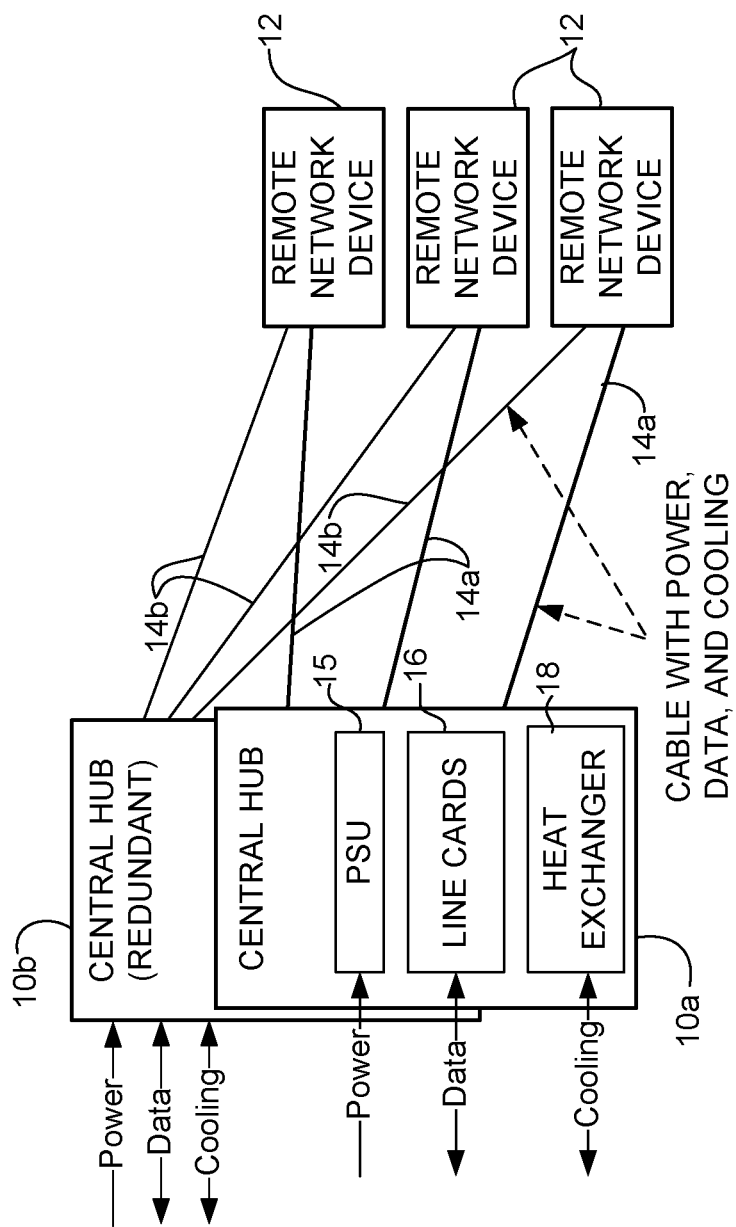
FIG. 2 illustrates the network of FIG. 1 with a redundant central hub.

FIG. 2 illustrates an example of a redundant PoE+F+C system. Fault tolerance is a concern for critical remote devices. Redundant connections for power and data are needed to protect against the failure of a central hub, its data connections to the Internet, or primary power supplies. If the coolant flow stops, or the supplied coolant is too hot, a remote device's high power components could exceed their safe operating temperature in just a few seconds. The network shown in the example of FIG. 2 provides backup power, data, and cooling in case of failure of the central hub 10a or any single cable. Critical remote network devices 12 may have two combined cables 14a, 14b serving them, as shown in FIG. 2. Each cable 14a, 14b may home on an independent central hub 10a, 10b, with each central hub providing data, power, and cooling. In very critical applications, cables 14a and 14b may be routed using different physical paths to each remote network device 12, so mechanical damage at one point along the cable route will not interrupt the data, power, or coolant to the remote device.

In one embodiment, each heat sink or heat exchanger at the remote device 12 (shown in FIG. 3 and described below) comprises two isolated fluid channels, each linked to one of the redundant central hubs 10a, 10b. If the coolant flow stops from one hub, the other hub may supply enough coolant (e.g., throttled up by a control system described below) to keep the critical components operational. Isolation is essential to prevent loss of pressure incidents in one fluid loop from also affecting the pressure in the redundant loop.

The cable's jacket may include two small sense conductors for use in identifying a leak in the cooling system. If a coolant tube develops a leak, the coolant within the jacket causes a signal to be passed between these conductors, and a device such as a TDR (Time-Domain Reflectometer) at the central hub 10a, 10b may be used to locate the exact position of the cable fault, thereby facilitating repair.

In one or more embodiments, the central hubs 10a, 10b may provide additional power, bandwidth, or cooling as needed in the network. Both circuits 14a, 14b may be used simultaneously to provide power to an equipment power circuit to provide higher power capabilities. Similarly, redundant data fibers may provide higher network bandwidth, and redundant coolant loops may provide higher cooling capacity. The control systems (described below) manage failures and revert the data, power, and cooling to lower levels if necessary. In another example, redundant central hubs 10a, 10b may form a dual-star topology.

It is to be understood that the network devices and topologies shown in FIGS. 1 and 2, and described above are only examples and the embodiments described herein may be implemented in networks comprising different network topologies or a different number, type, or arrangement of network devices, without departing from the scope of the embodiments. For example, the network may comprise any number or type of network communications devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. For example, the PoE+F+C system may be used in a fog node deployment in which computation, networking, and storage are moved from the cloud to locations much closer to IoT sensors and actuators. The fog nodes may provide power to PoE devices such as streetlights, traffic signals, 5G cells, access points, base stations, video cameras, or any other electronic device serving a smart building, smart city, or any other deployment. Multiple branching topologies (not shown) may be supported, where, for example a central hub provides PoE+F+C cables to a plurality of intermediate hubs, which divide the power, data, and cooling capabilities to further PoE+F+C cables that serve the remote network devices.

Figure 3:
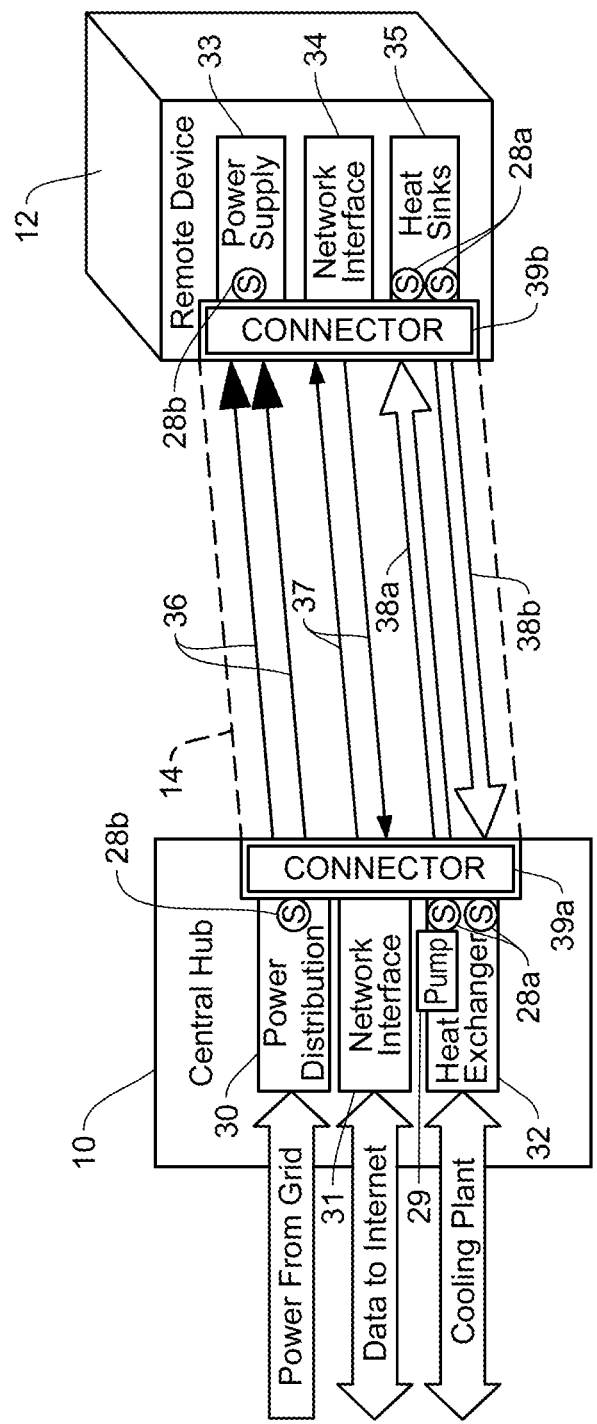
FIG. 3 illustrates an example of power, data, and cooling delivery from a central hub to a remote device in the network of FIG. 1.

FIG. 3 schematically illustrates the cable 14 transmitting power, data, and cooling from the central hub 10 to the remote device 12, in accordance with one embodiment. In this example, the central hub 10 includes a power distribution module 30 for receiving power from a power grid, network interface 31 for receiving data from and transmitting data to a network (e.g., Internet), and a heat exchanger 32 for fluid communication with a cooling plant. The power distribution module 30 provides power to a power supply module 33 at the remote device 12. The network interface 31 at the central hub 10 is in communication with the network interface 34 at the remote device 12. The heat exchanger 32 at the central hub 10 forms a cooling loop with one or more heat sinks 35 at the remote device 12. The central hub 10 may provide control logic for the cooling loop, as well as the power and data transport functions of the combined cable 14, as described below.

In the example shown in FIG. 3, the cable 14 includes two power lines (conductors) 36, two data lines (optical fibers) 37, and two coolant tubes (supply 38a and return 38b) coupled to connectors 39a and 39b located at the central hub 10 and remote device 12, respectively. The closed coolant loop is established through the two coolant tubes 38a, 38b that share the same combined cable jacket with the fibers 37 that provide bidirectional data connectivity to the network and conductors 36 that provide power from the power grid.

In one or more embodiments, various sensors 28a monitor aggregate and individual branch coolant temperatures, pressures, and flow rate quantities at strategic points around the loop. Other sensors 28b monitor the current and voltage of the power delivery system at either end of power conductors 36. One or more valves may be used to control the amount of cooling delivered to the remote device 12 based upon its instantaneous needs, as described below. The coolant may comprise, for example, water, antifreeze, liquid or gaseous refrigerants, or mixed-phase coolants (partially changing from liquid to gas along the loop).

The central hub 10 maintains a source of low-temperature coolant that is sent through distribution plumbing (such as a manifold), through the connector 39a, and down cable's 14 coolant supply line 38a to the remote device 12. The connector 39b on the remote device 12 is coupled to the cable 14, and the supply coolant is routed through elements inside the device such as heat sinks 35 and heat exchangers that remove heat (described further below with respect to FIG. 5). The warmed coolant may be aggregated through a return manifold and returned to the central hub 10 out the device's connector 39b and through the return tube 38b in the cable 14. The cable 14 returns the coolant to the central hub 10, where the return coolant passes through the heat exchanger 32 to remove the heat from the coolant loop to an external cooling plant, and the cycle repeats. The heat exchanger 32 may be a liquid-liquid heat exchanger, with the heat transferred to chilled water or a cooling tower circuit, for example. The heat exchanger 32 may also be a liquid-air heat exchanger, with fans provided to expel the waste heat to the atmosphere. The hot coolant returning from the cable 14 may be monitored by sensor 28a for temperature, pressure, and flow. Once the coolant has released its heat, it may pass back through a pump 29 and sensor 28a, and then sent back out to the cooling loop. One or more variable-speed pumps 29 may be provided at the central hub 10 or remote device 12 to circulate the fluid around the cooling loop.

In an alternate embodiment, only a single coolant tube is provided within the cable 14, and high pressure air (e.g., supplied by a central compressor with an intercooler) is used as the coolant. When the air enters the remote device 12, it is allowed to expand and/or impinge directly on heat dissipating elements inside the device. Cooling may be accomplished by forced convection via the mass flow of the air and additional temperature reduction may be provided via a Joule-Thomson effect as the high pressure air expands to atmospheric pressure. Once the air has completed its cooling tasks, it can be exhausted to the atmosphere outside the remote device 12 via a series of check valves and mufflers (not shown).

In cold environments the coolant may be supplied above ambient temperature to warm the remote device 12. This can be valuable where remote devices 12 are located in cold climates or in cold parts of industrial plants, and the devices have cold-sensitive components such as optics or disk drives. This may be more energy efficient than providing electric heaters at each device, as is used in conventional systems.

The cooling loops from all of the remote devices 12 may be isolated from one another or be intermixed through a manifold and a large central heat exchanger for overall system thermal efficiency. The central hub 10 may also include one or more support systems to filter the coolant, supply fresh coolant, adjust anti-corrosion chemicals, bleed air from the loops, or fill and drain loops as needed for installation and maintenance of cables 14 and remote devices 12.

The connectors 39a and 39b at the central hub 10 and remote device 12 are configured to mate with the cable 14 for transmitting and receiving power, data, and cooling. In one embodiment, the connectors 39a, 39b carry power, fiber, and coolant in the same connector body. The connectors 39a, 39b are preferably configured to mate and de-mate (couple, uncouple) easily by hand or robotic manipulator.

In order to prevent coolant leakage when the cable 14 is uncoupled from the central hub 10 or remote device 12, the coolant lines 38a, 38b and connectors 39a, 39b preferably include valves (not shown) that automatically shut off flow into and out of the cable, and into and out of the device or hub. In one or more embodiments, the connector 39a, 39b may be configured to allow connection sequencing and feedback to occur. For example, electrical connections may not be made until a verified sealed coolant loop is established. The cable connectors 39a, 39b may also include visual or tactile evidence of whether a line is pressurized, thereby reducing the possibility of user installation or maintenance errors.

In one or more embodiments, a distributed control system comprising components located on the central hub's controller and on the remote device's processor may communicate over the fiber links 37 in the combined cable 14. The sensors 28a at the central hub 10 and remote device 12 may be used in the control system to monitor temperature, pressure, or flow. Servo valves or variable speed pumps 29 may be used to insure the rate of coolant flow matches requirements of the remote thermal load. As previously described, temperature, pressure, and flow sensors 28a may be used to measure coolant characteristics at multiple stages of the cooling loop (e.g., at the inlet of the central hub 10 and inlet of the remote device 12) and a subset of these sensors may also be strategically placed at outlets and intermediate points. The remote device 12 may include, for example, temperature sensors to monitor die temperatures of critical semiconductors, temperatures of critical components (e.g., optical modules, disk drives), or the air temperature inside a device's sealed enclosure. The control system may monitor the remote device's internal temperatures and adjust the coolant flow to maintain a set point temperature. This feedback system insures the correct coolant flow is always present. Too much coolant flow will waste energy, while too little coolant flow will cause critical components in the remote device 12 to overheat.

Machine learning may also be used within the control system to compensate for the potentially long response times between when coolant flow rates change and the remote device's temperatures react to the change. The output of a control algorithm may be used to adjust the pumps 29 to move the correct volume of coolant to the device 12, and may also be used to adjust valves within the remote device to direct different portions of the coolant to different internal heat sinks to properly balance the use of coolant among a plurality of thermal loads.

The control system may also include one or more safety features. For example, the control system may instantly stop the coolant flow and begin a purge cycle if the coolant flow leaving the central hub 10 does not closely match the flow received at the remote devices 12, which may indicate a leak in the system. The control system may also shut down a remote device if an internal temperature exceeds a predetermined high limit or open relief valves if pressure limits in the coolant loop are exceeded. The system may also predictively detect problems in the cooling system such as a pressure rise caused by a kink in the cable 14, reduction in thermal transfer caused by corrosion of heat sinks 35, or impending bearing failures in pump 29, before they become serious.

All three utilities (power, data, cooling) provided by the combined cable 14 may interact with the control system to keep the system safe and efficient. For example, sensors 28*b* may be located in the power distribution module 30 of the central hub and power supply 33 of the remote device 12. Initial system modeling and characterization may be used to provide expected power, flow properties, and thermal performance operating envelopes, which may provide an initial configuration for new devices and a reference for setting system warning and shut-down limits. This initial characteristic envelope may be improved and fine-tuned over time heuristically through machine learning and other techniques. If the system detects additional power flow in power conductors 36 (e.g., due to a sudden load increase in CPU in remote device 12), the control system may proactively increase coolant flow in anticipation of an impending increase in heat sink 35 temperature, even before the temperature sensors register it. This interlock between the various sensors and control systems helps to improve the overall responsivity and stability of the complete system.

Figure 4:
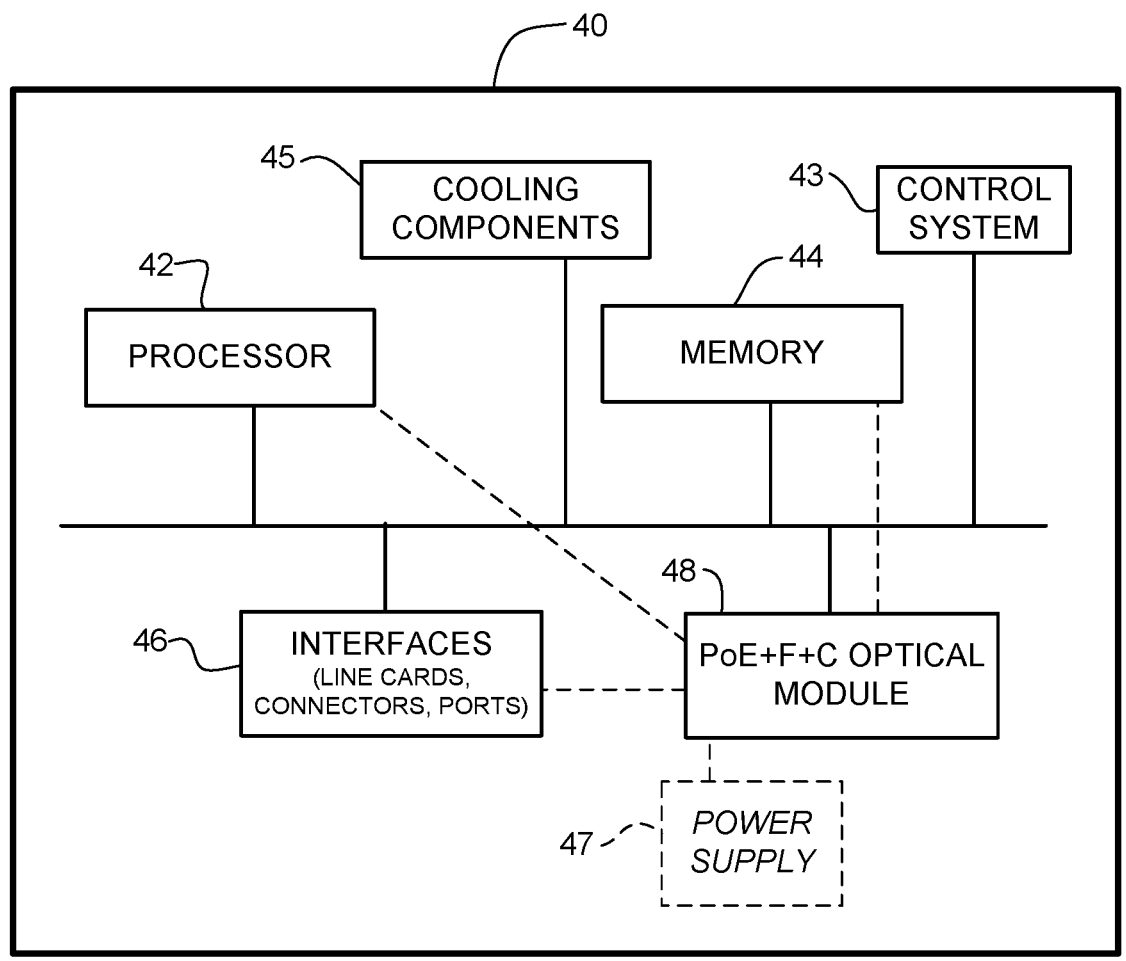
FIG. 4 depicts an example of a network device useful in implementing embodiments described herein.

FIG. 4 illustrates an example of a network device 40 (e.g., central hub 10, remote device 12 in FIG. 3) that may be used to implement the embodiments described herein. In one embodiment, the network device 40 is a programmable machine that may be implemented in hardware, software, or any combination thereof. The network device 40 includes one or more processors 42, control system 43, memory 44, cooling components (pumps, valves, sensors) 45, and interfaces (electrical, optical, fluid) 46. In one or more embodiments, the network device 40 may include a PoE+F optical module 48 (e.g., optical module configured for receiving power from power supply 47 and data).

The network device 40 may include any number of processors 42 (e.g., single or multi-processor computing device or system), which may communicate with a forwarding engine or packet forwarder operable to process a packet or packet header. The processor 42 may receive instructions from a software application or module, which causes the processor to perform functions of one or more embodiments described herein. The processor 42 may also operate one or more components of the control system 43. The control system (controller) 43 may comprise components (modules, code, software, logic) located at the central hub 10 and remote device 12, and interconnected through the combined cable 14 (FIGS. 1 and 4). The cooling components 45 may include any number of sensors and actuators within the cooling loop to provide input to the control system 43 and react to its commands.

Memory 44 may be a volatile memory or non-volatile storage, which stores various applications, operating systems, modules, and data for execution and use by the processor 42. For example, components of the optical module 48, control logic for cooling components 45, or other parts of the control system 43 (e.g., code, logic, or firmware, etc.) may be stored in the memory 44. The network device 40 may include any number of memory components.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described below with respect to the flowchart of FIG. 7 or other functions such as power level negotiations, safety subsystems, or thermal control, as described herein. The network device 40 may include any number of processors 42.

The interfaces 46 may comprise any number of interfaces (e.g., power, data, and fluid connectors, line cards, ports, combined connectors 39*a*, 39*b* for connecting to cable 14 in FIG. 3)) for receiving data, power, and cooling, or transmitting data, power, and cooling to other devices. A network interface may be configured to transmit or receive data using a variety of different communications protocols and may include mechanical, electrical, and signaling circuitry for communicating data over physical links coupled to the network or wireless interfaces. One or more of the interfaces 46 may be configured for PoE+F+C, PoE+F, PoE, PoF, or similar operation.

The optical module 48 may comprise hardware or software for use in power detection, power monitor and control, or power enable/disable, as described below. The optical module 48 may further comprise one or more of the processor or memory components, or interface for receiving power and optical data from the cable at a fiber connector, for delivering power and signal data to the network device, or transmitting control signals to the power source, for example. Power may be supplied to the optical module by the power supply 47 and the optical module (e.g., PoE+F optical module) 48 may provide power to the rest of the components at the network device 40.

It is to be understood that the network device 40 shown in FIG. 4 and described above is only an example and that different configurations of network devices may be used. For example, the network device 40 may further include any suitable combination of hardware, software, algorithms, processors, devices, components, or elements operable to facilitate the capabilities described herein.

Figure 5:
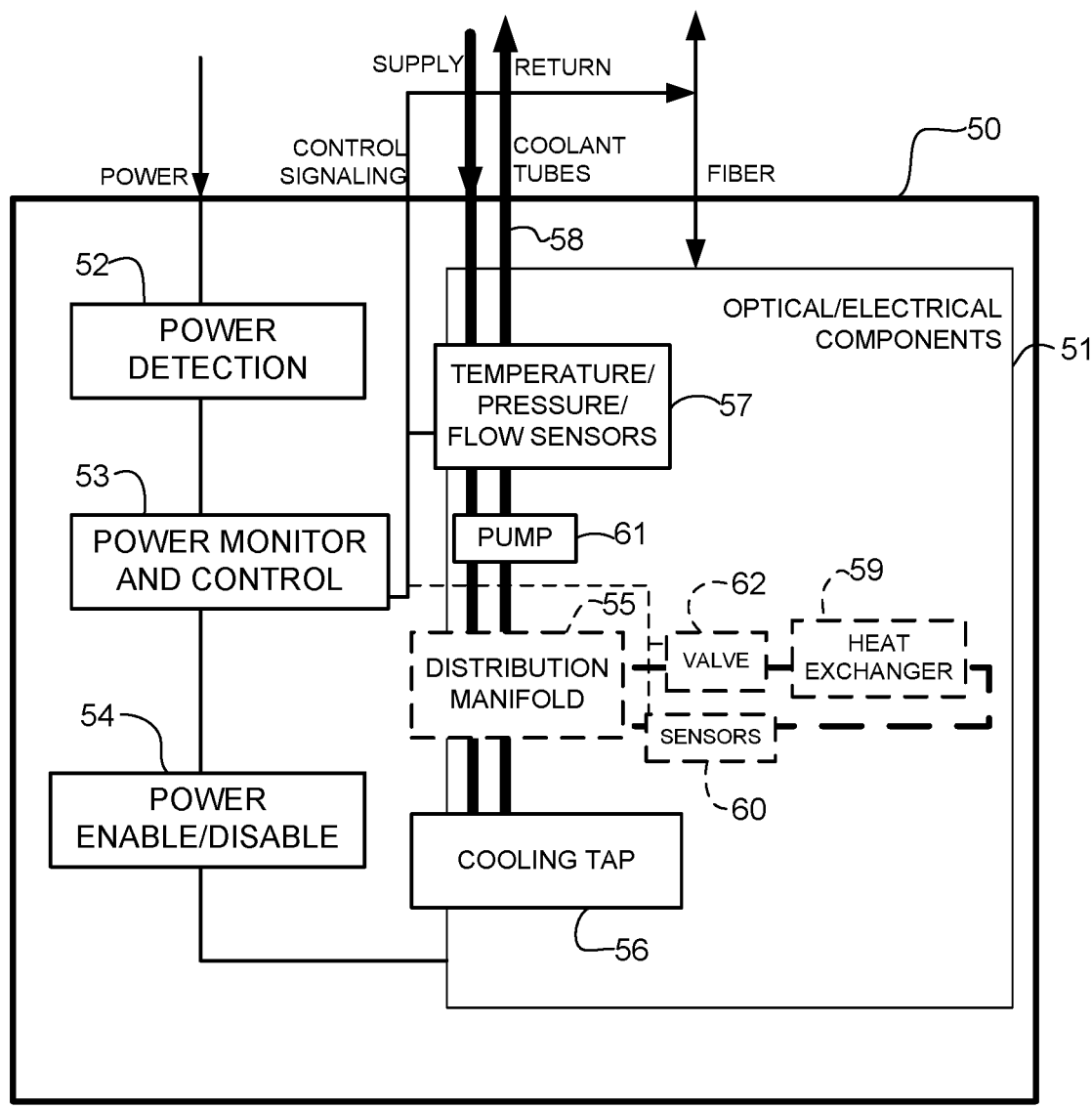
FIG. 5 is block diagram illustrating power and cooling monitoring and control at the remote device, in accordance with one embodiment.

FIG. 5 is a block diagram illustrating PoE+F+C components at a remote device 50, in accordance with one embodiment. The system components provide for communication with the power source (e.g., network device 10 in FIG. 1) during power up of the powered device and may also provide fault protection and detection. The network device 50 includes optical/electrical components 51 for receiving optical data and converting it to electrical signals (or converting electrical signals to optical data) and power components including power detection module 52, power monitor and control unit 53, and power enable/disable module 54. The power components 52, 53, 54 may be isolated from the optical components 51 via an isolation component (e.g., isolation material or element), which electromagnetically isolates the power circuit from the optical components to prevent interference with operation of the optics.

The power detection module 52 may detect power, energize the optical components 51, and return a status message to the power source. A return message may be provided via state changes on the power wires or over the optical channel. In one embodiment, the power is not enabled by the power enable/disable module 54 until the optical transceiver and the source have determined that the device is properly connected and the network device to be powered is ready to be powered. In one embodiment, the device 50 is configured to calculate available power and prevent the cabling system from being energized when it should not be powered (e.g., during cooling failure). The power detection module 52 may also be operable to detect the type of power applied to the device 50, determine if PoE or pulsed power is a more efficient power delivery method, and then use the selected power delivery mode once the power is enabled. Additional modes may support other power+data standards (e.g., USB (Universal Serial Bus)).

The power monitor and control device 53 continuously monitors power delivery to ensure that the system can support the needed power delivery, and no safety limits (voltage, current) are exceeded. The power monitor and control device 53 may also monitor optical signaling and disable power if there is a lack of optical transitions or communication with the power source. Temperature, pressure, or flow sensors 57, 60 may also provide input to the power monitor and control module 53 so that power may be disabled if the temperature at the device 50 exceeds a specified limit.

Cooling is supplied to the device 50 via cooling (coolant) tubes in a cooling (coolant) loop 58, which provides cooling to the powered equipment through a cooling tap (heat sink, heat exchanger) 56, 59 and returns warm (hot) coolant to the central hub. The network device 50 may also include a number of components for use in managing the cooling. The cooling loop 58 within the network device 50 may include any number of sensors 57, 60 for monitoring aggregate and individual branch temperature, pressure, and flow rate at strategic points around the loop (e.g., entering and leaving the device, at critical component locations). The sensor 57 may be used, for example, to check that the remote device 50 receives approximately the same amount of coolant as supplied by the central hub to help detect leaks or blockage in the cable, and confirm that the temperature and pressure are within specified limits.

Distribution plumbing routes the coolant in the cooling loop 58 to various thermal control elements within the network device 50 to actively regulate cooling through the individual flow paths. For example, a distribution manifold 55 may be included in the network device 50 to route the coolant to the cooling tap 56 and heat exchanger 59. If the manifold has multiple outputs, each may be equipped with a valve 62 (manual or servo controlled) to regulate the individual flow paths. Thermal control elements may include liquid cooled heatsinks, heat pipes, or other devices directly attached to the hottest components (CPUs (Central Processing Units), GPUs (Graphic Processing Units), power supplies, optical components, etc.) to directly remove their heat. The network device 50 may also include channels in cold plates or in walls of the device's enclosure to cool anything they contact. Air to liquid heat exchangers, which may be augmented by a small internal fan, may be provided to cool the air inside a sealed box. Once the coolant passes through these elements and removes the device's heat, it may pass through additional temperature, pressure, or flow sensors, through another manifold, and out to the coolant return tube. In the example shown in FIG. 5, the cooling system includes a pump 61 operable to help drive the coolant around the cooling loop 58 or back to the central hub.

The distribution manifold 55 may comprise any number of individual manifolds (e.g., supply and return manifolds) to provide any number of cooling branches directed to one or more components within the network device 50. Also, the cooling loop 58 may include any number of pumps 61 or valves 62 to control flow in each branch of the cooling loop. This flow may be set by an active feedback loop that senses the temperature of a critical thermal load (e.g., die temperature of a high power semiconductor), and continuously adjusts the flow in the loop that serves the heat sink or heat exchanger 59. The pump 61 and valve 62 may be controlled by the control system and operate based on control logic received from the central hub in response to monitoring at the network device 50.

It is to be understood that the network device 50 shown in FIG. 5 is only an example and that the network device may include different components or arrangement of components, without departing from the scope of the embodiments. For example, the cooling system may include any number of pumps, manifolds, valves, heat sinks, heat exchangers, or sensors located in various locations within the coolant loop or arranged to cool various elements or portions of the device. Also, the network device 50 may include any number of power sensors or control modules operable to communicate with the control system at the central hub to optimize power delivery and cooling at the network device.

FIGS. 6A, 6B, and 6C illustrate three examples of multi-function cables 14 that may be used to carry utilities (power, data, and cooling) between the central hub 10 and the remote device 12 as shown in FIGS. 1, 2, and 3. The cable may be a few kilometers long or any other suitable length.

In the examples shown in FIGS. 6A, 6B, and 6C, the cable comprises optical fibers 65 for data (at least one in each direction for conventional systems, or at least one for bi-directional fiber systems), power conductors 66 (for each polarity) (e.g., heavy stranded wires for pulsed power), coolant tubes 67 (at least one in each direction for liquid systems, or at least one for compressed air systems), and a protective shield 68. These components, along with one or more additional components that may be used to isolate selected elements from each other, manage thermal conductivity between the elements, or provide protection and strength, are contained within an outer jacket 64 of the cable.

The components may have various cross-sectional shapes and arrangements, as shown in FIGS. 6A-6C. For example, the coolant tubes 67 may be cylindrical in shape as shown in FIGS. 6A and 6C or have a semi-circle cross-sectional shape, as shown in FIG. 6B. The coolant tubes 67 may also have more complex shaped cross-sections (e.g., "C" or "D"

shape), which may yield more space and thermally efficient cables. The complex shaped coolant tube profiles may also include rounded corners to reduce flow head pressure loss. Supply and return tube wall material thermal conductivity may be adjusted to optimize overall system cooling.

The cable may be configured to prevent heat loss through supply-return tube-tube conduction, external environment conduction, coolant tube-power wire conduction, or any combination of these or other conditions, as described below.

Over a long cable, a type of unwelcome counter flow heat exchange may be created as the coolant supply tube receives heat via internal conduction in the cable from the hotter coolant return tube, which tends to equalize the two temperatures along the length of the cable (referred to as supply-return tube-tube conduction). For example, the supply coolant may be so preheated by the return coolant flowing in the opposite direction that it is much less effective in cooling the remote device. In one embodiment, a thermal isolation material 69 located between the two coolant tubes 67 may be used to prevent undesirable heat conduction, as shown in FIGS. 6A, 6B, and 6C. The insulation material 69 may be, for example, a foamed elastomer or any other suitable material.

External cable temperatures may influence thermal energy flow into and out of the cable, potentially reducing system cooling effectiveness. Placement of the thermal isolator material 69 between the coolant tubes and the outer jacket 64 as shown in FIG. 6A may be used to control this flow. However, in some cases, it may be desired to deliberately provide one or both coolant tubes 67 with a low thermal impedance path to the outside, as shown in FIG. 6B. Regions 70 replace the thermal insulation with a thermally conductive material. This may be useful, for example in buried or undersea cables where a linear ground coupled heat exchanger is created. Heat from the device is transferred by the circulating fluid to the ground, and reduced mechanical cooling is needed at the central hub.

A third mode of heat transfer that may be controlled by the design of the cable is between the power conductors and the coolant tubes. The cross-sectional size of the power conductors is preferably minimized to reduce volume, weight, and cost of copper and improve flexibility of the cable. However, smaller conductors have higher resistance, and $I^2R$ losses will heat the length of the cable (potentially hundreds of Watts in systems that deliver kilowatt levels of power over multi-kilometer distances). By providing thermally conductive paths inside the cable between the power conductors 66 and coolant tube 67, as depicted by regions 71 in FIG. 6C, some of the cooling power of the loop may be used to keep the power conductors in the cables cool. In this example, the conductive thermal paths 71 extend between the return coolant tube 67 and power conductors 66. The selective use of insulation and thermally conductive materials may be used to control conduction within the cable. Additionally, reflective materials and coatings (e.g., aluminized Mylar) may be applied to control radiative heat transfer modes, as shown by layer 72 in FIG. 6C.

In one or more embodiments, in order to reduce fluid frictional effects, tube interiors may be treated with hydrophobic coatings and the coolant may include surfactants. Also, the supply and return coolant tubes 67 may be composed of materials having different conductive properties so that the complete cable assembly may be thermally tuned to enhance system performance.

It is to be understood that the configuration, arrangement, and number and size of power wires, fibers, coolant tubes, and insulation regions, shields, coatings, or layers shown in FIGS. 6A-6C are only examples and that other configurations may be used without departing from the scope of the embodiments.

Figure 7:
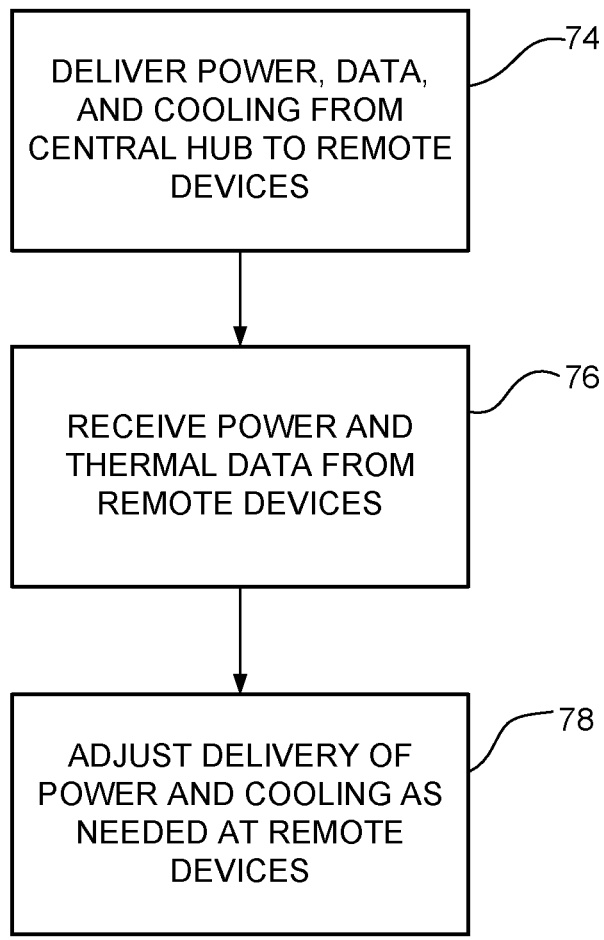
FIG. 7 is a flowchart illustrating an overview of a process for combined power, data, and cooling delivery in a communications network, in accordance with one embodiment.

FIG. 7 is a flowchart illustrating an overview of a process for delivering combined power, data, and cooling in a communications network, in accordance with one embodiment. At step 74, power, data, and cooling are delivered in the combined cable 14 from central network device 10 to a plurality of remote communications devices 12 (FIGS. 1 and 7). The central network device 10 receives power and thermal data from the remote devices over the cable, based on monitoring of power and cooling at the remote devices (step 76). The central network device 10 adjusts delivery of power and cooling as needed at the remote devices (step 78). The remote communications devices are powered by the power and cooled by the cooling delivered by the central network device, thereby eliminating the need for a separate power supply or external cooling.

It is to be understood that the process shown in FIG. 7 is only an example of a process for delivering combined power, data, and cooling, and that steps may be added, removed, combined, or modified, without departing from the scope of the embodiments.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
    delivering power, data, and cooling from a central network device to a plurality of remote communications devices over cables connecting the central network device to the remote communications devices, each of the cables carrying said power, data, and cooling; and
    receiving at the central network device, power and thermal data from the remote communications devices based on monitoring of power and cooling at the remote communications devices;
    wherein the remote communications devices are continuously powered by said power and cooled by said cooling delivered from the central network device over the cables throughout operation of the remote communications devices; and
    wherein the central network device comprises a router in communication with the remote communications devices over a communications network comprising the cables for delivering power, data, and cooling to each of the remote communications devices, wherein at least one of the remote communications devices comprises a network switch.

2. The method of claim 1 further comprising adjusting delivery of said cooling to at least one of the remote communications devices based on said thermal data from the remote communications devices.

3. The method of claim 1 further comprising adjusting delivery of said cooling to at least one of the remote communications devices based on said power data from the remote communications devices.

4. The method of claim 1 further comprising monitoring temperature, pressure, and flow of a coolant loop delivering said cooling to the remote communications devices.

5. The method of claim 1 further comprising identifying a coolant leak based on flow data received from the remote communications devices and stopping delivery of said cooling to at least one of the remote communications devices.

6. The method of claim 1 wherein the central network device is located at least 1 km from each of said plurality of remote communications devices and wherein said power comprises a power output of at least 100 Watts.

7. The method of claim 1 wherein said power comprises pulsed power.

8. The method of claim 1 further comprising adjusting delivery of the power, data, and cooling to the remote communications devices based on the power and thermal data received from the remote communications devices.

9. The method of claim 8 further comprising utilizing machine learning to adjust said delivery of the power, data, and cooling to the remote communications devices.

10. A method comprising:
delivering power, data, and cooling from a central network device to a plurality of remote communications devices over cables connecting the central network device to the remote communications devices, each of the cables carrying said power, data, and cooling;
receiving at the central network device, power and thermal data from the remote communications devices based on monitoring of power and cooling at the remote communications devices; and
adjusting delivery of said cooling to at least one of the remote communications devices to compensate for response time between changes in delivery of said cooling and said thermal data based on machine learning;
wherein the remote communications devices are powered by said power and cooled by said cooling delivered from the central network device.

11. The method of claim 10 further comprising identifying a coolant leak based on flow data received from the remote communications devices and stopping delivery of said cooling to at least one of the remote communications devices.

12. The method of claim 10 wherein said power comprises pulsed power.

13. The method of claim 10 further comprising determining a type of power applied to one of the remote communications devices, determining if Power over Ethernet or pulsed power is a more efficient power delivery method, and selecting a power delivery mode for the remote communications device.

14. A network device comprising:
network switch comprising at least one line card or fabric card;
a processor in communications with a forwarding engine at the network switch and operable to process a packet;
a connector for connecting the network switch to a cable delivering power, data, and cooling to the network switch, the connector comprising:
an optical interface for receiving optical communications signals;
an electrical interface for receiving power for powering the network switch;
a fluid interface for receiving coolant;
a cooling loop for cooling electrical components of the network switch with the coolant; and
a monitoring system for continuously monitoring the cooling loop and providing feedback to a central network device delivering said power, data, and cooling to the network switch over the cable during operation of the network switch;
wherein the central network device comprises a router in communication with the network switch over a communications network comprising the cable.

15. The apparatus of claim 14 further comprising a second connector for receiving said power, data, and cooling from a redundant central network device.

16. The apparatus of claim 14 wherein the cable comprises optical fibers, power conductors, coolant tubes, and a thermal isolation material between the coolant tubes contained within an outer cable jacket.

17. The apparatus of claim 14 wherein the cable comprises a thermal path between power conductors and a coolant tube and through an outer jacket of the cable.

18. The apparatus of claim 14 wherein the processor is in communication with a controller at the central network device over optical fiber in the cable, the processor and the controller defining a distributed control system for controlling cooling at the apparatus.

19. The apparatus of claim 14 further comprising a manifold comprising at least one valve operable to direct said coolant to different portions of the apparatus based on input from a controller at the central network device.

20. The apparatus of claim 14 wherein the monitoring system comprises temperature, pressure, and flow sensors located in the cooling loop and wherein the fluid interface comprises a coolant supply interface and a coolant return interface.

21. The apparatus of claim 14 wherein the monitoring system is further configured to monitor power at the apparatus and provide feedback to the central network device.

22. The network device of claim 14 wherein the power comprises pulsed power.

23. An apparatus comprising:
a connector for connecting the apparatus to a cable delivering power, data, and cooling to a plurality of remote communications devices, the connector comprising:
an optical interface for delivering optical communications signals;
an electrical interface for delivering power for powering the remote communications devices; and
a fluid interface for delivering cooling to the remote communications devices; and
a control system for modifying delivery of said cooling to the remote communications devices based on feedback received from the remote communications devices;
wherein the control system utilizes machine learning to modify delivery of said cooling.

24. The apparatus of claim 23 further comprising at least one servo valve and at least one pump for controlling delivery of said cooling based on said feedback.

25. The apparatus of claim 23 wherein the control system is configured to modify delivery of said power based on said feedback.

26. The apparatus of claim 23 wherein the control system is operable to identify a coolant leak based on flow data received from the remote communications devices and stop delivery of said cooling to at least one of the remote communications devices.

27. The apparatus of claim 23 wherein the control system is operable to select a power delivery mode for each of the remote communications devices, wherein the power delivery mode comprises Power over Ethernet or pulsed power.

28. The apparatus of claim 23 wherein the power comprises pulsed power.

* * * * *